United States Patent [19]
Watson

[11] 3,857,384
[45] Dec. 31, 1974

[54] CERVICAL TISSUE CELL SPECIMEN GATHERING DEVICE

[76] Inventor: George W. Watson, 2159 Downington Ave., Salt Lake City, Utah 84108

[22] Filed: Apr. 9, 1973

[21] Appl. No.: 348,960

[52] U.S. Cl.................... 128/2 B, 128/304, 350/92
[51] Int. Cl............................................. A61b 10/00
[58] Field of Search...... 128/2 B, 2 W, 304; 350/92, 350/95

[56] References Cited
UNITED STATES PATENTS

| | | | |
|---|---|---|---|
| 2,415,480 | 2/1947 | Gassert | 350/95 X |
| 2,522,108 | 9/1950 | Flagg | 128/2 B |
| 2,847,000 | 8/1958 | Nieburgs | 128/2 B |
| 2,955,591 | 10/1960 | MacLean | 128/2 B |
| 3,220,300 | 11/1965 | Von Huene | 350/92 X |
| 3,498,860 | 3/1970 | Pickett | 350/92 X |
| 3,592,186 | 7/1971 | Oster | 128/2 B |

Primary Examiner—Kyle L. Howell
Attorney, Agent, or Firm—Criddle & Thorpe

[57] ABSTRACT

A device for obtaining cervical specimens directly as smears on microscope slides for cytologic evaluation. An identification slide is mounted in one end of a slide carrier that is slidably journaled in a tubular insertion housing, and the slide is arranged to be removed from the slide carrier after a smear has been obtained by rotation of the slide carrier and slide with respect to the insertion housing.

7 Claims, 6 Drawing Figures

PATENTED DEC 31 1974　　　　　　　　　　3,857,384

3,857,384

CERVICAL TISSUE CELL SPECIMEN GATHERING DEVICE

BRIEF DESCRIPTION OF THE INVENTION

1. FIELD OF THE INVENTION

This invention relates to devices adapted to be inserted into the vaginal canal and cervix area of a woman such that a specimen of cell tissue from the cervix area can be obtained and withdrawn to be examined for evidence of cervical cancer or other disease.

2. BACKGROUND OF THE INVENTION

It is well recognized that women are subject to cervical cancer, and that certain women are more subject to this form of cancer than are other women. It is also well recognized that if the symptoms of the cancer can be detected in very early stages, treatment is much more effective. As a result, it is desirable that all women periodically be tested for symptoms of such cancer, and that particularly those in the high risk category be tested on a rather frequent basis. Presently, in order to detect the presence of the cancer, it is necessary that tissue cells from the cervical area be obtained, and that the cells be examined under a microscope, as they are subjected to recognized staining procedures.

In the past, many women have been negligent in having the necessary detection test performed, or have been reluctant to undergo such testing. This has been because the devices used for gathering such cells have had to be operated by a trained person so that the person being examined would not be injured, and so that a proper specimen of cells from a potential cancer growth area of the cervix would be obtained. The inconveniences involved in obtaining such samples have, all too often, caused women to neglect having the necessary tests performed.

There have recently been proposed a number of devices that can be more easily used to obtain specimens to be used in cytologic diagnosis. These devices are intended to allow a woman to obtain cell specimens from her own body without the need for special training in the use of specimen obtaining devices. Naturally, with these proposed devices, as with the device of the present invention, it is also entirely possible that they can be used by trained medical personnel to obtain the necessary tissue cell samples. In any event, these more recently developed devices are intended to permit a woman to obtain samples, herself, at home, and to then send them for cytologic analysis.

2. Prior Art

In my copending U.S. application, Ser. No. 125,143, filed Mar. 17, 1971, there is disclosed a self-operated device wherein an expansible chamber is inflated to be in contact with tissues and to collect cells thereon. However, this device, while somewhat successful, is subject to undesirable contamination, and as it expands and may somewhat physically disturb the specimen cells thereon.

Another cervical specimen gathering device, incorporating a rotatable, break-away paddle is also disclosed in my previously mentioned application for U.S. Patent, Ser. No. 125,143. While this device has proven useful, it has not been entirely satisfactory under all conditions since it may not incorporate a specimen slide of the type some laboratories are equipped to store and process. Furthermore, some women, particularly in the less developed areas of the world are not capable of following directions regarding the breaking off of a handle and a paddle, and it is desirable to have a specimen gathering device requiring a minimum of handling steps.

SUMMARY OF THE INVENTION

It is a principal object of the present invention to provide a lowcost, self-operated device that will enable a woman to easily obtain a cervical tissue cell specimen in such a fashion that the specimen can thereafter be conveniently analyzed and tested.

Other objects are to provide a cervical specimen gathering device that can be safely used, without danger to the user, and that provides for easy handling of the specimen collected.

Principal features of the invention include an insertion tube through which a slide carrier is slidably and rotatably inserted. A microscope slide is positioned within one end of the carrier, and the other end of the carrier projects through the insertion tube and has a rotating handle thereon. A collar limits retraction of the slide carrying end of the carrier, while allowing that end to be positioned fully within the insertion tube, and the rotating handle limits the extent to which the slide carrying end can be moved to project from the insertion tube.

The slide carrier is constructed to hold the microscope slide therein until the user exerts sufficient removal force to separate the slide from the carrier.

Additional objects and features of the invention will become apparent from the following detailed description and drawings, disclosing what is presently contemplated as being the best mode of the invention.

THE DRAWINGS

In the drawings:

FIG. 1 is a perspective view of the cervical tissue cell gathering device of the invention, taken from one side and slightly above the device at the front end thereof;

FIG. 2, a vertical central section view, taken on the line 2—2 of FIG. 1;

FIG. 3, a view like that of FIG. 2, but showing the device in position for the collecting of specimen cells;

FIG. 4, an enlarged view of the slide carrying end of the slide carrier as shown in FIGS. 1 and 2;

FIG. 5, a transverse section view taken on the line 5—5 of FIG. 4; and

FIG. 6, a side elevation view of the end of the slide carrier shown in FIG. 4, with the slide release position of the carrier shown in dotted lines.

DETAILED DESCRIPTION

Figure 1:
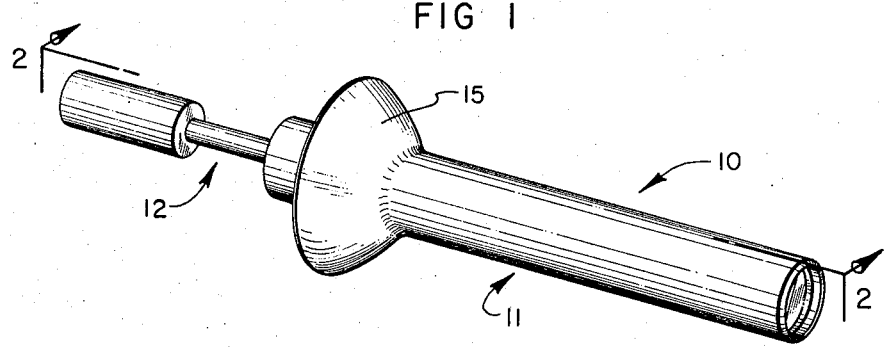
Figure 2:
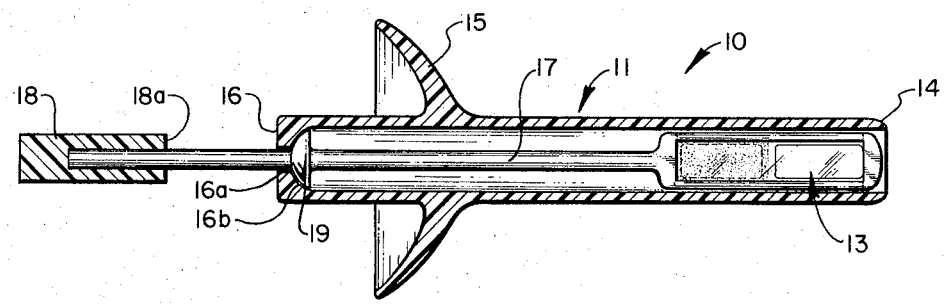
Figure 3:
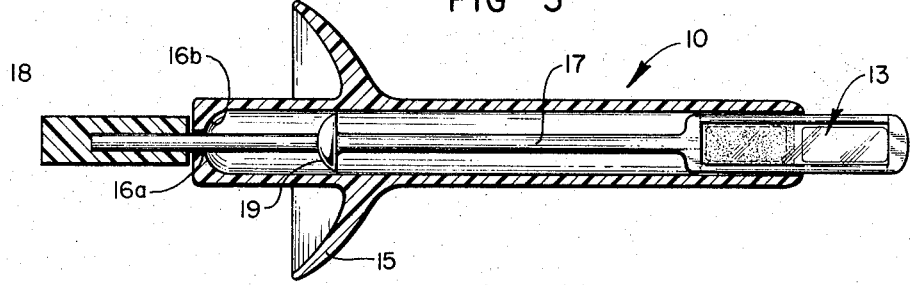
Figure 4:
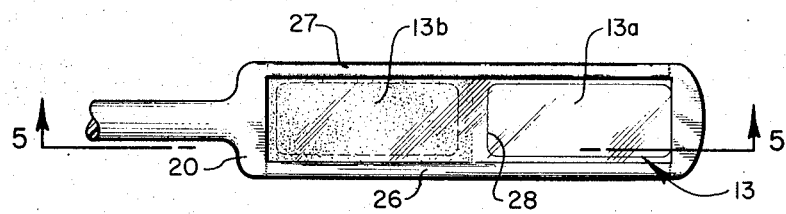
Figure 5:
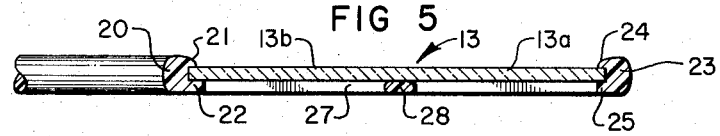

Referring now to the drawings:

In the illustrated preferred embodiment, the cervical tissue cell gathering device of the invention, shown generally at 10, includes an insertion tube 11, a slide carrier 12, and a microscope slide 13.

The insertion tube 11 is of generally elongate tubular construction, and is preferably formed of an inexpensive, sterilizable material such as rubber, or a suitable plastic having sufficient rigidity for use in the manner to be hereinafter explained.

The insertion end of the tube 11 is rounded, as shown at 14, so that no sharp edges are provided at that end, and a locating shield 15, preferably formed integrally with the tube, radiates outwardly from the tube intermediate the tube length and near the rear end 16, opposite to the insertion end.

A hole 16a is provided through the rear end 16, and a shaft 17 of a slide carrier 12 extends slidably and rotatably therethrough.

An enlarged handle 18 on one end of shaft 17 provides a shoulder 18a that limits movement of shaft 17 in one direction through rear end 16, and a special collar 19, fixed to the shaft 17 within the tube 11, engages a concave, semi-spherical seat 16a on the inside of rear end 16 to limit travel of shaft 17 through the rear wall in the other direction. It has been found that the spherical collar, while guiding the shaft 17 within the tube 11, holds the shaft centered and prevents sticking of the shaft within the tube.

The insertion end of insertion tube 11 is fully open so that an enlarged end of the slide carrier opposite to the handle end will freely reciprocate into and out of the tube bore, and can freely rotate therein, as will be further explained.

The enlarged end of the slide carrier comprises a supporting frame for the microscope slide 13. The supporting frame, which preferably is formed integrally with the shaft 17, includes a rear transverse member 20 that is recessed to provide an upper lip 21 and a lower support 22, and a forward transverse member 23 that is recessed to form an upper lip 24 and a lower support 25. A pair of side rails 26 and 27 interconnect the ends of the transverse members, and each extends slightly inwardly to form continuations of the lower supports 22 and 25. A cross member 28 extends between the spaced side rails 26 and 27, centrally of their length, to interconnect the inwardly turned portions of the side rails.

The slide carrier, like the insertion tube, is preferably formed of an inexpensive, sterilizable material such as rubber or plastic, and the supporting frame is made to be somewhat bendable.

The corners and edges of the supporting frame are all made smooth and rounded so that a user will not be injured thereby.

Microscope slide 13 is transparent and may be of tempered glass or the like, or of acrylic plastic, not subject to chemical changes, discoloration, distortion, etc., when used as a slide for cervical tissue cells and processed according to well known standard testing procedures.

Figure 6:
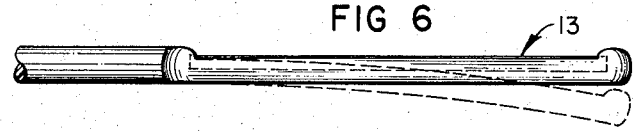

The microscope slide 13 is preferably formed with two distinct sections. One of the sections 13a has a smooth collection surface on which a tissue cell is collected and the other section 13b has a frosted data receiving surface on which patient data can be readily written, printed, or otherwise applied by the cytologist. The slide, which is of generally elongate, rectangular configuration, is inserted into the supporting frame such that one end is positioned within the recess of rear transverse member 20, and the other end is positioned within the recess of the forward transverse member 23, and the slide is resting on the lower supports of the transverse members, the inturned portions of the side rails, and the cross member 28. The slide is then securely held in place by the upper lips 21 and 24 until such time as the forward ends of the side rails are bent down (FIG. 6) away from the slide, and the lip 24 is slipped off the end of the slide. The slide can then be easily removed from the recessed transverse member 20 for processing, as will be described.

The distance from the locating shield 15 to the insertion end of the insertion tube 11 is such that when the tube has been inserted through the vaginal canal of the woman user until stopped by the positioning shield, the insertion end is positioned at the cervix and in the area of most frequent cancer growth. It has been found that for most adult women, this length is preferably from three to 4½ inches, and preferably is about 3½ inches. The outside diameter of the insertion tube desirably does not exceed three-quarter inch, and preferably is about five-eigth inch, so that the tube can be readily inserted through the vaginal canal.

In use, the cervical tissue cell specimen gathering device is assembled, sterilized, and dispensed in a sterile container. The device can then be self-operated and used by a woman desiring to obtain her own cervical tissue cell specimen, or it can be operated by trained medical personnel to obtain such a specimen.

In any event, the tube is inserted, insertion end first, in the vaginal canal, until stopped by the shield 15. During the insertion, the slide carrier is positioned to place collar 19 against seat 16b at the end 16 of tube 11, and the slide 13 and the support frame therefore are fully within the tube 11 where the slide is largely protected against contamination.

When the insertion tube has been properly positioned, handle 18 is grasped to push the shaft 17 through the tube 11 until the handle contacts the rear end 16 of the tube 11. This moves the support frame until the collection surface of the slide extends from the insertion end and into the cervical area. The handle 18 is fully rotated to collect tissue cells on the collection surface of the extended slide, and the handle 18 is then pulled rearwardly until collar 10 engages rear end 16 and the support frame and slide 13 are again fully within the insertion tube. Tube 11 is then withdrawn and the specimen has been collected.

After the specimen has been collected, the handle 18 is used to again move the support frame and slide 13 to extend from the insertion end of the insertion tube. As is well known, a fixative is sprayed over the collection surface of the slide and the cell specimen thereon, and the fixative is allowed to harden or dry. The fixative, of course, will maintain the cells in their uncontaminated natural shape and condition for an extended period of time, even though they may be subjected to rough treatment.

When the fixative has hardened or dried, the slide 13 is removed from the support frame in the manner previously described, the slide is placed in a previously furnished sterile container and is delivered to a laboratory for staining and analysis under the microscope. At the laboratory, such identifying patient information as may be necessary for proper laboratory handling is applied to the frosted side of the slide. The slide, which may be three-eighth inch or more wide, 3 inches in length, and up to about one-fourth inch thick is easily handled and used with conventional microscopes.

Tube 11 is preferably formed essentially straight, and has sufficient wall rigidity to allow it to be inserted into the vaginal canal without collapsing of the tube. The support frame extends diametrically across the tube 11 and into close proximity with opposite sides of the inner tube wall.

Although a preferred form of my invention has been herein disclosed, it is to be understood that such disclosure is by way of example, and that variations are possi-

I claim:

1. A cervical tissue cell specimen gathering device comprising
   an elongate, tubular insertion housing having an open insertion end and a rear end with a hole therethrough;
   a slide carrier including a shaft extending slidably and rotatably from a handle larger than said hole in the rear end, through said hole and into said housing, a collar on the shaft within the housing limiting travel of the shaft through the rear end in the direction of the handle, and a support frame for a slide at the end of the shaft opposite to the handle, said support frame being entirely within the housing when the collar is in engagement with the rear end of the housing, and projecting at least partially from the housing when the handle is in engagement with the rear end of the housing; and
   a microscope slide having a collection surface thereon, said slide being removably secured to the support frame, whereby said collection surface on the slide is outside the housing when the handle is in engagement with the rear end of the housing.

2. A cervical tissue cell specimen gathering device as in claim 1, wherein
   the slide has a cell gathering section formed of smooth material and a data receiving section formed of material adapted to receive character data thereon.

3. A cervical tissue cell specimen gathering device as in claim 2, wherein
   the data receiving section is within the housing when the handle is in engagement with the rear end of the insertion tube.

4. A cervical tissue cell specimen gathering device as in claim 3, wherein
   the support frame is flexible and includes means whereby the microscope slide is snapped into the support frame and is adapted to be released therefrom during bending of said support frame.

5. A cervical tissue cell specimen gathering device as in claim 4, further including
   a positioning shield radiating from the insertion tube housing.

6. A cervical tissue cell specimen gathering device as in claim 4, wherein
   the support frame is formed as one piece with the shaft of the slide carrier.

7. A cervical tissue cell specimen gathering device as in claim 1, wherein
   the support frame is flexible and includes means whereby the microscope slide is snapped into the support frame and is adapted to be released therefrom during bending of said support frame.

* * * * *